United States Patent [19] [11] 3,859,265
Hepworth [45] Jan. 7, 1975

[54] PRODUCTION OF POLYALKENMERS FROM MONOMERS OF NORBORNENE STRUCTURE CONTAINING POLAR GROUPS

[75] Inventor: Paul Hepworth, Stockton-on-Tees, England

[73] Assignee: Imperial Chemical Industries Limited, London, England

[22] Filed: June 21, 1972

[21] Appl. No.: 264,874

[52] U.S. Cl. .................. 260/85.5 R, 260/33.6 UA, 260/33.8 UA, 85.5 A, 86.1 R, 87.3, 87.5 R, 260/88.7 A, 260/89.1, 260/89.3, 260/91.5
[51] Int. Cl. ........... C08f 3/62, C08f 3/74, C08f 5/00
[58] Field of Search ............ 260/89.5 R, 91.5, 89.3, 260/89.1, 88.7 R, 88.7 A, 86.1 R, 85.5 R, 85.5 A, 87.3, 87.5 R

[56] References Cited
UNITED STATES PATENTS

| | | | |
|---|---|---|---|
| 2,838,479 | 6/1958 | Biletch | 260/89.5 R |
| 3,085,885 | 4/1963 | Caldwell | 260/89.5 R |
| 3,336,275 | 8/1967 | Michelotti | 260/89.5 R |
| 3,557,062 | 1/1971 | Vergne et al. | 260/89.5 R |
| 3,692,872 | 9/1972 | Calderon et al. | 260/878 R |

Primary Examiner—Harry Wong, Jr.
Attorney, Agent, or Firm—Cushman, Darby & Cushman

[57] ABSTRACT

Certain specified norbornene derivatives are polymerised with ring-opening using W, Mo or Ta compounds together with organo-aluminum compounds.

9 Claims, No Drawings

PRODUCTION OF POLYALKENMERS FROM MONOMERS OF NORBORNENE STRUCTURE CONTAINING POLAR GROUPS

THIS INVENTION concerns the production of polymers of the polyalkenamer class and, more particularly, the production of such polymers from cyclic olefinic compounds containing the norbornene structure (bicyclo[2, 2,1]heptene-2). Polyalkenamers are a class of polymer produced from cyclic olefines by ring-opening of monomer molecules between double-bonded carbon atoms, which then separately link up with similar carbon atoms of other ring-opened monomer molecules to mutually satisfy their free valencies by forming new double-bonds and hence extended molecular chains.

According to the present invention, homopolymers and copolymers of the polyalkenamer class are produced by homo- or copolymerisation of a monomer of norbornene structure which contains an esterified hydroxyl or carboxyl group (—O.COR or —COOR), a halogen atom (e.g. Cl or Br) or a nitrile group (CN) as a substituent in the five position of the norbornene structure or pendant to that five-position through an alkylene radical preferably, methylene, and optionally with an alkyl group containing, say, one to six carbon atoms, as a cosubstituent in the five-position instead of a hydrogen atom, by bringing the substituted norbornene, optionally with a co-polymerisable cyclic olefine especially a cyclic mono-olefine, in the liquid phase and optionally in solution in an organic solvent, for example an aromatic hydrocarbon solvent such as benzene or toluene, into contact with a polymerisation catalyst comprising a tungsten, molybdenum or tantalum compound and an organo-metallic compound of Group I$a$, II$a$, II$b$ or III$a$ of the Periodic Classification. Polymers and copolymers of certain of the aforedescribed norbornene derivatives are described and claimed in U.K. Patent Specification No. 1,230,597.

Suitable tungsten compounds are $W^V$ and $W^{VI}$ compounds, especially the halides and oxyhalides, particularly $WCl_5$, $WCl_6$, $WOCl_4$, $WO_2Cl_2$. Suitable molybdenum compounds include molybdenum pentahalide, e.g. $MoCl_5$. Suitable tantlum compounds are $TaCl_5$ and $TaBr_5$. Preferred organo-metallic compounds are aluminum —alkyls, —alkyl hydrides and —alkyl halides of general formula $AlR_xX_y$ wherein $x + y$ equals 3, and $x$ is 1, 2 or 3 and R is lower alkyl, e.g. ethyl, isopropyl, isobutyl or n-hexyl and X (if present) is hydrogen or, preferably, halogen, e.g. chloride. As alternatives to organoaluminium compounds, analogous Mg, Be and Zn compounds may be used. The catalyst systems may, if desired, include a controlled quantity of an organic oxygen compound such as a peroxide, hydroperoxide or alcohol and where such inclusion causes liberation of hydrogen halide by elimination of halogen from a catalyst components, such hydrogen halide may be removed before catalyst use. Advantageously the proportion of organo-metallic compound incorporated in the catalyst is greater on a molar basis than the proportion of W, Mo or Ta compound, e.g. such that the Al : W (say) atomic ratio is at least 2 : 1, preferably at least 4 : 1, and very satisfactorily of the order of 10 : 1.

The present invention includes the option to prepare the catalyst system and/or to conduct the polymerisation reaction in a suitable organic solvent such as a cycloaliphatic or aromatic hydrocarbon (e.g. benzene or toluene). The polymerisation reaction is conveniently carried out at around ambient temperature but a wide range of temperatures are allowed. In practice a temperature will ordinarily be chosen in the range of from −30°to +50°C, although when lower molecular weight products are desired the temperature is advantageously somewhat higher, e.g. 55° to 70°C. The production of lower molecular weight polymers is also encouraged by including a controlled small proportion of a chain-stopping acyclic mono-olefine, e.g. octene-1 in the reaction medium.

The radical R of the norbornene ester groups is advantageously an alkyl radical containing from one to six carbon atoms. Norbornenyl compounds to use as monomers are conveniently preparable by addition reaction between cyclopentadiene and appropriate olefinically unsaturated compounds, e.g. vinyl compounds, alpha-alkyl vinyl compounds and allyl compounds, as described for example in U.K. Patent Specification No. 1,123,878.

The following Examples illustrate the present invention:-

EXAMPLE 1

Norbornenyl acetate (50 g.) was diluted with benzene (100 mls.) in a nitrogen blanketted flask. Tungsten hexachloride (5 m.moles) dissolved in benzene (100 mls.) and ethanol (5 m.moles) dissolved in benzene (50 mls.) were then added and the flask contents were purged with nitrogen to remove HCl released by reaction between the $WCl_6$ and the ethanol. Thereafter aluminium sesquichloride (50 m.moles) dissolved in solvent EC.180 (50 mls.) was added. (EC.180 is hydrogenated isobutene trimer). The ensuing polymerisation reaction was allowed to proceed for 20 minutes (initial temperature 20°C, final temperature 25°C) and was then terminated by addition of 50 mls. of a mixture of Nonox WSP (1 g.), ethanolamine (3 g.) ethanol (20 g.) and benzene (100 mls.). Nonox WSP is a proprietory brand of anti-oxidant. The yield of polymer was 48 g (96 percent) of molecular weight 68, 800 ± 1 percent. The polymer was soluble in benzene, toluene and carbon tetrachloride.

EXAMPLE 2

Norbornenyl acetate (30 g.) was dissolved in benzene (470 mls.) in a nitrogen blanketted flask. Tungsten hexachloride (1 m.mole) was dissolved in benzene (20 mls.) and ethanol (1 m.mole) dissolved in benzene (20 mls.) and ethanol (1 m.mole) dissolved in benzene (10 mls.) were then added and the flask contents were purged with nitrogen to remove HCl released by reaction between the $WCl_6$ and the ethanol. Thereafter aluminium sesquichloride (2 m.moles) dissolved in solvent EC.180 (2 mls.) was added. (EC.180 is hydrogenated isobutene trimer). The ensuing polymerisation reaction was allowed to proceed for 120 minutes (initial temperature 20°C), and was then terminated by addition of 10 mls. of a mixture of Nonox WSP (1 g.), ethanolamine (3 g.), ethanol (20 g.) and benzene (100 mls.). Nonox WSP is a proprietory brand of anti-oxidant. The yield of polymer was 15.2 g.(52 percent). The polymer was soluble in benzene, toluene and carbon tetrachloride.

EXAMPLE 3

The procedure of Example 1 was repeated using norbornene-2, 5-carbonitrile instead of norbornenyl acetate. The polymerisation reaction period was, however, 120 minutes in this case. The yield of polymer was of the order of 50 percent; the polymer was insoluble in benzene, toluene, carbontetrachloride and the other common solvents.

EXAMPLE 4

The procedure of Example 2 was followed using the norbornenyl compound produced by addition reaction between methymethacrylate and cyclopentadiene, viz. the methyl ester of norbornene-2, 5-methyl, 5-carboxylic acid. The polymerisation reaction period was here 45 minutes and the yield of polymer (soluble in benzene) was of the order of 73 percent.

EXAMPLE 5

Example 4 was repeated using the ethyl ester of norbornene-2, 5-carboxylic acid as monomer. A 76 percent yield of polymer, soluble in benzene and carbontetrachloride, was obtained.

EXAMPLE 6

Example 3 was repeated using norbornenyl chloride as the monomer instead of the nitrile. Again a ring-opened polymer was obtained.

EXAMPLE 7

Norbornenyl acetate (100 g.) was diluted with toluene (400 mls.) in a nitrogen blanketted flask. Tungsten hexachloride (8 m.moles) dissolved in benzene (100 mls.) and ethanol (8 m.moles) dissolved in benzene (50 mls.) were then added and the flask contents were purged with nitrogen to remove HCl released by reaction between the $WCl_6$ and the ethanol. Thereafter aluminium sesquichloride (40 m.moles) dissolved in solvent EC.180 (40 mls.) was added. (EC.180 is hydrogenated isobutene trimer). The ensuing polymerisation reaction was allowed to proceed for 20 minutes at a temperature of 60°C and was then terminated by addition of 50 mls. of a mixture of Nonox WSP (1 g.), ethanolamine (3 g.), ethanol (20 g.) and benzene (100 mls.). Nonox WSP is a proprietory brand of antioxidant. The resultant polymer was recovered in 60 percent yield and had an intrinsic viscosity of 1.3.

EXAMPLE 8

Example 7 was repeated with the sole difference that the reaction mixture included octene-1 (20 m.moles). The resultant polymer had an intrinsic viscosity of 0.32, demonstrating the chainstopping effect of the included acyclic mono-olefine.

In all of these Examples, the polymers were positively identified as being of the polyalkenamer class (i.e. ring-opened) by analytical techniques, including nuclear magnetic resonance spectroscopy.

I claim:

1. A polymerisation process which comprises contacting a norbornene which is in the liquid phase and which is substituted in the five-position by a substituent selected from the group consisting of a —O.COR group, a —COOR group, where R is a $C_1$ to $C_6$ alkyl, a halogen atom and a nitrile group or which is substituted by one of said substituents pendant to the five-position through a methylene radical, with a catalyst consisting essentially of a tungsten, molybdenum or tantalum compound and an organo-metallic compound of aluminum, magnesium, berylium or zinc, the ratio of metal in the organo-metallic compound to tungsten, molybdenum or tantalum being at least 2:1.

2. The process of claim 1 in which the five-position of the norbornene is also substituted by an alkyl group.

3. The process of claim 1 in which a polymerizable cyclic mono-olefine is present.

4. The process of claim 1 in which an organic solvent is used, the solvent being a cycloaliphatic or aromatic hydrocarbon.

5. The process of claim 1 in which the catalyst consists essentially of a tungsten halide or oxyhalide, or a molybdenum or tantalum halide together with an aluminum, magnesium, berylium or zinc alkyl, alkyl hydride or alkyl halide.

6. The process of claim 1 in which the catalyst also contains a peroxide, hydroperoxide or alcohol.

7. The process of 1 in which the norbornene is 5-substituted substituted norbornene-2 in which the 5-substituent is selected from the group consisting of a —O.COR group, a —COOR group, where R is a $C_1$ to $C_6$ alkyl, chlorine, bromine and a nitrile group or is one of said substituents pendant to the five-position through a methylene group and which is contacted in an aromatic hydrocarbon solvent at −30°C to +70°C with a catalyst consisting essentially of a tungsten halide or oxyhalide, or a molybdenum or tantalum halide together with an aluminum alkyl, alkyl hydride or alkylhalide, the aluminum to tungsten, molybdenum or tantalum ratio being at least 2:1.

8. The process of claim 7 in which a copolymerisable cyclic mono-olefine is also present.

9. The process of claim 7 in which the norbornene is also substituted in the five-position by a $C_1$ to $C_6$ alkyl group.

* * * * *